(No Model.)

L. I. SHOEMAKER.
NUT LOCK.

No. 536,102. Patented Mar. 19, 1895.

Witnesses:
L. Morgan
John B. J. Fenton

Inventor:
L. I. Shoemaker
By B. Zoller
atty

UNITED STATES PATENT OFFICE.

LEWIS I. SHOEMAKER, OF FOREST, INDIANA.

NUT-LOCK.

SPECIFICATION forming part of Letters Patent No. 536,102, dated March 19, 1895.

Application filed July 14, 1892. Renewed February 14, 1895. Serial No. 538,443. (No model.)

*To all whom it may concern:*

Be it known that I, LEWIS I. SHOEMAKER, a citizen of the United States, residing at Forest, in the county of Clinton and State of Indiana, have invented certain new and useful Improvements in Lock-Nuts; and I do hereby declare the following to be a full, clear, and exact description of the invention, such as will enable others skilled in the art to which it appertains to make and use the same.

This invention relates to improvements in nut locks and has for its object the construction of a device for preventing the accidental displacement of the nut from the bolt upon which it has been placed.

The object further is to provide a simple and inexpensive construction that may be quickly and easily applied to bolts and nuts of usual construction and that may be thrown out of engagement at will so as to allow the free and unobstructed working of the nut upon the bolt when so desired.

The object further is to provide a device that will allow the nut to be screwed on, but that cannot be unscrewed without special adjustment.

The objects of this invention are accomplished by the mechanism illustrated in the accompanying drawings, in which—

Figure 1:
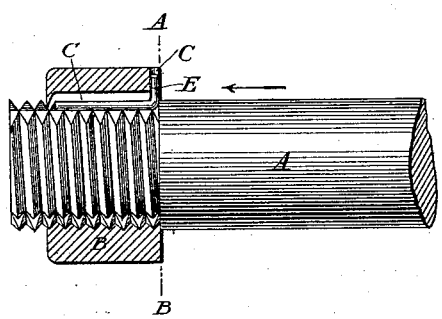
Figure 2:
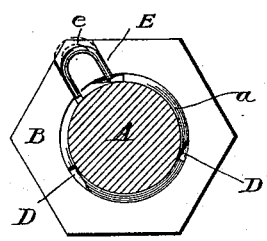
Figure 4:
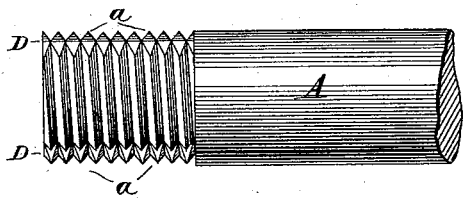
Figure 3:
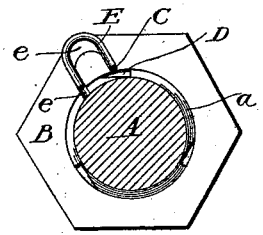

Figure 1 is a detail view of a bolt and nut, and shows the nut in section to illustrate the interior construction; Fig. 2, a transverse section through the line A B, looking in the direction of the arrow; Fig. 3, a view of same in which the key is shown in its elevated position, and Fig. 4, a detail in side elevation of a bolt with the nut off and showing the groove for the engagement of the locking key.

Similar letters refer to like parts throughout the several views.

Referring to the drawings, A, represents the bolt having the threads $a$, of usual construction, and B, is the nut having inside threads to correspond with the threads on the bolt.

D, is a longitudinal groove and is transverse with relation to the threads. It extends to the bottom of the threads and is formed so that one face of the groove or notch is parallel with the radial line of the bolt and the opposite side of the notch is approximately at right angles to the radial face, thus forming a groove or notch with an easy approach on one side and an abrupt face on the opposite side. The object of this construction will be more fully set forth hereinafter.

C, is a groove across the threads of the nut, corresponding in position with that on the bolt and is designed to receive a key E. This key E, is bent into a hook or loop at one end and the hooked portion bent at right angles to the key as shown in the drawings. A slot $e$, in the side of the nut is adapted to receive the hooked end of the key which will be inserted therein as shown in Figs. 2 and 3, and forms a guide for the sides of the hook in raising and lowering the key in locking and unlocking the nut. The slot or groove C, in the nut is of sufficient depth to allow the key to be drawn out so as to be entirely free from contact and engagement with the threads of the bolt.

The notch in the threads of the bolt is shaped with an abrupt face on one side, as previously mentioned, so as to engage the key, when the latter is pushed down into the notch and lock the nut so it cannot be unscrewed until the key is withdrawn, but by making a gradual approach on the opposite side of the notch, the nut can be turned or screwed onto the bolt but not off. The sloping face of the notch thus gradually forces the wedge up out of contact with the threads in the operation of screwing the nut onto the bolt, but on reversing the direction of the nut the square shoulder comes in contact with the key and is firmly locked. A series of grooves or notches will be provided on the bolt in order to lock without turning the bolt too far.

To unlock the nut at any time, the key may be raised by driving a wedge under the looped end of the key.

The principal object in letting the looped end of the key into the side of the nut, is to guard against accidental displacement of the key. As the nut is screwed up tight against the object to be bolted, it will be impossible to withdraw the key because of the obstruction which said object presents.

I claim—

A nut having a groove across its threads and a recess formed in its inner side, communicating therewith both to receive a key, the outer or straight portion of the key adapted to be inserted into the groove in the nut and having its outer end bent at right angles and into a hook, and adapted to operate in the recess in the side of the nut, and a bolt having notches across its threads to align with the groove in the nut to form a seat for the straight portion of the key and lock the nut on the bolt, substantially as described.

In testimony whereof I affix my signature in presence of two witnesses.

L. I. SHOEMAKER.

Witnesses:
H. L. VAN DORIN,
W. C. MCCUNE.